US008388861B2

(12) United States Patent
Wang et al.

(10) Patent No.: US 8,388,861 B2
(45) Date of Patent: Mar. 5, 2013

(54) LIQUID CRYSTAL COMPOUND AND LIQUID CRYSTAL MIXTURE

(76) Inventors: Chun-Chih Wang, Taichung (TW); Wen-Chung Chu, Kaohsiung (TW); Ren-Jie Chiou, Kaohsiung (TW); Shi-Zhi You, Beijing (CN); Hong-Wei Zhang, Hebei Province (CN); Yu-Dong Tan, Hebei Province (CN)

( * ) Notice: Subject to any disclaimer, the term of this patent is extended or adjusted under 35 U.S.C. 154(b) by 133 days.

(21) Appl. No.: 13/049,905

(22) Filed: Mar. 17, 2011

(65) Prior Publication Data

US 2012/0132854 A1 May 31, 2012

(30) Foreign Application Priority Data

Nov. 25, 2010 (CN) .......................... 2010 1 0558887

(51) Int. Cl.
*C09K 19/06* (2006.01)
*C09K 19/32* (2006.01)
*C09K 19/50* (2006.01)
*C09K 19/52* (2006.01)
*G02F 1/1333* (2006.01)

(52) U.S. Cl. ......... 252/299.62; 252/299.01; 252/299.61; 252/299.63; 252/299.64; 428/1.1; 428/1.3; 349/1; 349/56; 349/182

(58) Field of Classification Search ............. 252/299.01, 252/299.6, 299.61, 299.62, 299.63, 299.64; 428/1.1, 1.3; 349/1, 56, 182
See application file for complete search history.

(56) References Cited

U.S. PATENT DOCUMENTS 5,849,217 A * 12/1998 Nakamura et al. ....... 252/299.61

* cited by examiner

*Primary Examiner* — Geraldina Visconti
(74) *Attorney, Agent, or Firm* — Jianq Chyun IP Office

(57) ABSTRACT

A LC compound and a LC mixture are provided. The LC mixture includes a compound represented by (I) and at least one compound selected from a group consisting of compounds represented by (II) to (IV):

(I)

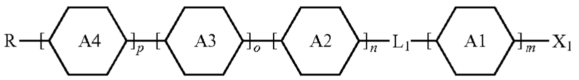

(II)

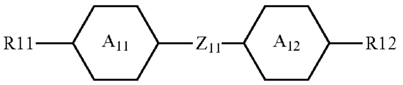

(III)

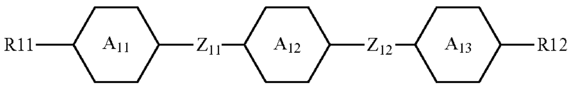

(IV)

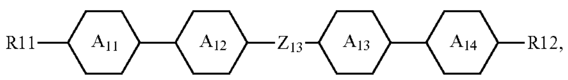

in which $X_1$ is F, —Cl, —CF3, or —$OCF_3$; R, R11, and R12 are independently H, a C1-C15 alkyl group, or a C2-C15 alkenyl group; A1 is 1,4-phenylene; $A_{11}$, $A_{12}$, $A_{13}$, and $A_{14}$ are independently selected from a group consisting of 1,4-phenylene, 1,4-cyclohexylene, and 2,5-tetrahydropyranylene; at least one of A2, A3, and A4 is 2,5-indanylene, and the others are independently selected from a group consisting of 1,4-phenylene, 1,4-cyclohexylene, and 2,5-tetrahydropyranylene; $L_1$ is —$F_2CO$—; $Z_{11}$, $Z_{12}$, and $Z_{13}$ are independently a single bond, —O—, —$F_2CO$—, or —COO—; m is 1; n, o and p are independently 0, 1, 2 or 3, and n+o+p≧3.

28 Claims, No Drawings

LIQUID CRYSTAL COMPOUND AND LIQUID CRYSTAL MIXTURE

CROSS-REFERENCE TO RELATED APPLICATION

This application claims the priority benefit of China application serial no. 201010558887.8, filed Nov. 25, 2010. The entirety of the above-mentioned patent application is hereby incorporated by reference herein and made a part of this specification.

BACKGROUND OF THE INVENTION

1. Field of the Invention

The present invention generally relates to a liquid crystal compound and a liquid crystal mixture, in particular, to a liquid crystal compound and a liquid crystal mixture having high thermal stability, a high clearing point, and good dielectric properties.

2. Description of Related Art

Liquid crystal displays (LCDs) are displays applying photoelectric changes of liquid crystal, and have attractive advantages such as small size, light weight, low power consumption, and good display quality, thus having become a mainstream flat panel display in recent years. With the development of the technology, the industry continuously uses various methods to improve the color saturation of LCDs, so as to meet requirements of users.

In terms of a liquid crystal material of LCDs, a liquid crystal compound and a liquid crystal mixture having high thermal stability, a high clearing point, and good dielectric properties can meet the current requirements. Specifically, an LCD may have good display performance, when the liquid crystal material inside has high thermal stability and a high clearing point. Meanwhile, an LCD may have a low driving voltage, when the liquid crystal material inside has good dielectric properties, thus achieving the purpose of electricity saving.

SUMMARY OF THE INVENTION

Accordingly, the present invention is directed to a liquid crystal mixture, which has high thermal stability, a high clearing point, and good dielectric properties.

The present invention is further directed to a liquid crystal compound, which has high thermal stability, a high clearing point, and good dielectric properties.

The present invention provides a liquid crystal mixture, which contains a compound represented by Formula (I) and at least one compound selected from a group consisting of compounds represented by Formulas (II) to (IV):

Formula (I)

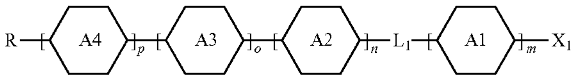

Formula (II)

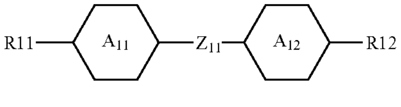

-continued

Formula (III)

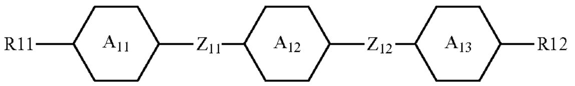

Formula (IV)

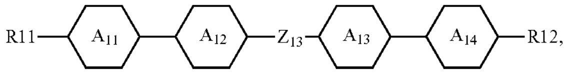

in which $X_1$ is F, Cl, —$CF_3$ or —$OCF_3$; R, R11 and R12 are independently H, a C1-C15 alkyl group, or a C2-C15 alkenyl group; A1 is 1,4-phenylene; $A_{11}$, $A_{12}$, $A_{13}$ and $A_{14}$ are independently selected from a group consisting of 1,4-phenylene, 1,4-cyclohexylene, and 2,5-tetrahydropyranylene; at least one of A2, A3 and A4 is 2,5-indanylene, and the others are independently selected from a group consisting of 1,4-phenylene, 1,4-cyclohexylene, and 2,5-tetrahydropyranylene; $L_1$ is —$F_2CO$—; $Z_{11}$, $Z_{12}$, and $Z_{13}$ are independently a single bond, —O—, —$F_2CO$—, or —COO—; m is 1; and n, o, and p are independently an integer of 0 to 3, and $n+o+p \geqq 3$.

In some embodiments of the present invention, $X_1$ is, for example, F or —$OCF_3$.

In the liquid crystal mixture of the present invention, the C1-C15 alkyl group is, for example, an unsubstituted C1-C15 alkyl group or a C1-C15 alkyl group substituted with —O—, —CO—, or —COO—.

In the liquid crystal mixture of the present invention, the C2-C15 alkenyl group is, for example, an unsubstituted C2-C15 alkenyl group or a C2-C15 alkenyl group substituted with —O—, —CO—, or —COO—.

In the liquid crystal mixture of the present invention, 1,4-phenylene is, for example, unsubstituted 1,4-phenylene or 1,4-phenylene substituted with at least one F or Cl.

In the liquid crystal mixture of the present invention, 1,4-cyclohexylene is, for example, unsubstituted 1,4-cyclohexylene or 1,4-cyclohexylene substituted with at least one F or Cl.

In the liquid crystal mixture of the present invention, 2,5-tetrahydropyranylene is, for example, unsubstituted 2,5-tetrahydropyranylene or 2,5-tetrahydropyranylene substituted with at least one F or Cl.

In the liquid crystal mixture of the present invention, 2,5-indanylene is, for example, unsubstituted 2,5-indanylene or 2,5-indanylene substituted with at least one F or Cl.

In the liquid crystal mixture of the present invention, based on the total weight of the liquid crystal mixture, the content of the compound represented by Formula (I) is, for example, between 10 wt % and 40 wt %.

In the liquid crystal mixture of the present invention, based on the total weight of the liquid crystal mixture, the content of the at least one compound selected from the group consisting of the compounds represented by Formulas (II) to (IV) is, for example, between 10 wt % and 50 wt %.

The present invention further provides a liquid crystal mixture, which contains a compound represented by Formula (I) and at least one compound selected from a group consisting of compounds represented by Formulas (V) to (VII):

Formula (I)

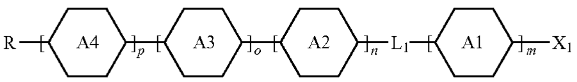

-continued

Formula (V)

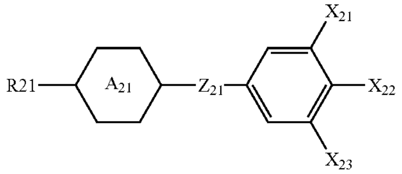

Formula (VI)

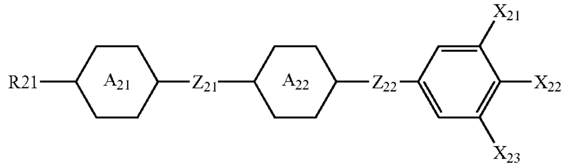

Formula (VII)

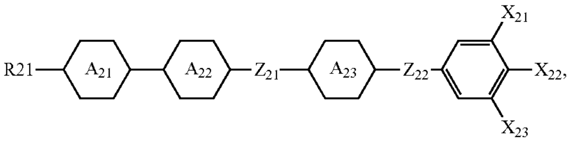

in which $X_1$, $X_{21}$, $X_{22}$, and $X_{23}$ are independently F, Cl, —$CF_3$, or —$OCF_3$; R and R21 are independently H, a C1-C15 alkyl group, or a C2-C15 alkenyl group; A1 is 1,4-phenylene; $A_{21}$, $A_{22}$, and $A_{23}$ are independently selected from a group consisting of 1,4-phenylene, 1,4-cyclohexylene, and 2,5-tetrahydropyranylene; at least one of A2, A3 and A4 is 2,5-indanylene, and the others are independently selected from a group consisting of 1,4-phenylene, 1,4-cyclohexylene, and 2,5-tetrahydropyranylene; $L_1$ is —$F_2CO$—; $Z_{21}$ and $Z_{22}$ are independently a single bond, —O—, —$F_2CO$—, or —COO—; m is 1; and n, o, and p are independently an integer of 0 to 3, and n+o+p≧3.

In some embodiments of the present invention, $X_1$, $X_{21}$, $X_{22}$, and $X_{23}$ are, for example, independently F or —$OCF_3$.

In the liquid crystal mixture of the present invention, the C1-C15 alkyl group is, for example, an unsubstituted C1-C15 alkyl group or a C1-C15 alkyl group substituted with —O—, —CO—, or —COO—.

In the liquid crystal mixture of the present invention, the C2-C15 alkenyl group is, for example, an unsubstituted C2-C15 alkenyl group or a C2-C15 alkenyl group substituted with —O—, —CO—, or —COO—.

In the liquid crystal mixture of the present invention, 1,4-phenylene is, for example, unsubstituted 1,4-phenylene or 1,4-phenylene substituted with at least one F or Cl.

In the liquid crystal mixture of the present invention, 1,4-cyclohexylene is, for example, unsubstituted 1,4-cyclohexylene or 1,4-cyclohexylene substituted with at least one F or Cl.

In the liquid crystal mixture of the present invention, 2,5-tetrahydropyranylene is, for example, unsubstituted 2,5-tetrahydropyranylene or 2,5-tetrahydropyranylene substituted with at least one F or Cl.

In the liquid crystal mixture of the present invention, 2,5-indanylene is, for example, unsubstituted 2,5-indanylene or 2,5-indanylene substituted with at least one F or Cl.

In the liquid crystal mixture of the present invention, based on the total weight of the liquid crystal mixture, the content of the compound represented by Formula (I) is, for example, between 10 wt % and 40 wt %.

In the liquid crystal mixture of the present invention, based on the total weight of the liquid crystal mixture, the content of the at least one compound selected from the group consisting of the compounds represented by Formulas (V) to (VII) is, for example, between 10 wt % and 50 wt %.

The present invention further provides a liquid crystal compound, which is represented by Formula (I):

Formula (I)

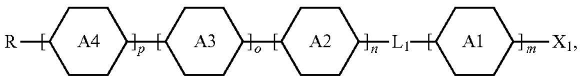

in which $X_1$ is F, Cl, —$CF_3$ or —$OCF_3$; $L_1$ is —$F_2CO$—; R is H, a C1-C15 alkyl group, or a C2-C15 alkenyl group; A1 is 1,4-phenylene; at least one of A2, A3 and A4 is 2,5-indanylene, and the others are independently selected from a group consisting of 1,4-phenylene, 1,4-cyclohexylene, and 2,5-tetrahydropyranylene; m is 1; and n, o, and p are independently an integer of 0 to 3, and n+o+p≧3.

In some embodiments of the present invention, $X_1$ is, for example, F or —$OCF_3$.

In the liquid crystal compound of the present invention, the C1-C15 alkyl group is, for example, an unsubstituted C1-C15 alkyl group or a C1-C15 alkyl group substituted with —O—, —CO—, or —COO—.

In the liquid crystal compound of the present invention, the C2-C15 alkenyl group is, for example, an unsubstituted C2-C15 alkenyl group or a C2-C15 alkenyl group substituted with —O—, —CO—, or —COO—.

In the liquid crystal compound of the present invention, 1,4-phenylene is, for example, unsubstituted 1,4-phenylene or 1,4-phenylene substituted with at least one F or Cl.

In the liquid crystal compound of the present invention, 1,4-cyclohexylene is, for example, unsubstituted 1,4-cyclohexylene or 1,4-cyclohexylene substituted with at least one F or Cl.

In the liquid crystal compound of the present invention, 2,5-tetrahydropyranylene is, for example, unsubstituted 2,5-tetrahydropyranylene or 2,5-tetrahydropyranylene substituted with at least one F or Cl.

In the liquid crystal compound of the present invention, 2,5-indanylene is, for example, unsubstituted 2,5-indanylene or 2,5-indanylene substituted with at least one F or Cl.

In view of the above, the liquid crystal compound of the present invention has high thermal stability, and a high clearing point, such that a display using a liquid crystal mixture containing the liquid crystal compound can achieve good display performance. In addition, the liquid crystal compound of the present invention has good dielectric properties, such that a display using a liquid crystal mixture containing the liquid crystal compound may have a low driving voltage, thus achieving a power-saving effect.

In order to make the aforementioned features and advantages of the present invention more comprehensible, embodiments are described in detail below.

DESCRIPTION OF THE EMBODIMENTS

In this specification, a single functional group represents an unsubstituted functional group and a substituted functional group, and a single group represents an unsubstituted group and a substituted group. For example 1,4-phenylene includes unsubstituted 1,4-phenylene and substituted 1,4-phenylene. Other single functional groups or single groups all represent groups in this manner, which is well known to persons skilled in the art, and will not be repeated herein.

The present invention provides a liquid crystal compound having high thermal stability, a high clearing point, and good dielectric properties, such that when an LCD uses a liquid crystal mixture containing the liquid crystal compound, the LCD may have good display performance and a low driving voltage.

The liquid crystal compound of the present invention is represented by Formula (I):

Formula (I)

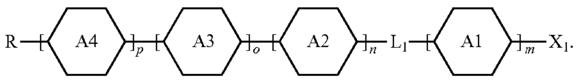

In Formula (I), $X_1$ is F, Cl, —CF3 or —$OCF_3$, with F or —$OCF_3$ being preferred.

$L_1$ is —$F_2CO$—.

R is H, a C1-C15 alkyl group, or a C2-C15 alkenyl group. The C1-C15 alkyl group is, for example, an unsubstituted C1-C15 alkyl group or a C1-C15 alkyl group substituted with —O—, —CO—, or —COO—. The C2-C15 alkenyl group is, for example, an unsubstituted C2-C15 alkenyl group or a C2-C15 alkenyl group substituted with —O—, —CO—, or —COO—.

A1 is 1,4-phenylene. 1,4-phenylene is, for example, unsubstituted 1,4-phenylene or 1,4-phenylene substituted with at least one F or Cl.

At least one of A2, A3, and A4 is 2,5-indanylene, and the others are independently selected from a group consisting of 1,4-phenylene, 1,4-cyclohexylene, and 2,5-tetrahydropyranylene. 2,5-indanylene is, for example, unsubstituted 2,5-indanylene or 2,5-indanylene substituted with at least one F or Cl. 1,4-phenylene is, for example, unsubstituted 1,4-phenylene or 1,4-phenylene substituted with at least one F or Cl. 1,4-cyclohexylene is, for example, unsubstituted 1,4-cyclohexylene or 1,4-cyclohexylene substituted with at least one F or Cl. 2,5-tetrahydropyranylene is, for example, unsubstituted 2,5-tetrahydropyranylene or 2,5-tetrahydropyranylene substituted with at least one F or Cl.

m is 1, n, o and p are independently an integer of 0 to 3, and $n+o+p \geqq 3$.

Since the liquid crystal compound of the present invention has the indane architecture, the liquid crystal compound of the present invention has a large dielectric constant.

In addition, the liquid crystal compound of the present invention may form a liquid crystal mixture with other liquid crystal compounds.

In an embodiment, a liquid crystal mixture is formed by the compound represented by Formula (I) and at least one compound selected from a group consisting of compounds represented by Formulas (II) to (IV):

Formula (II)

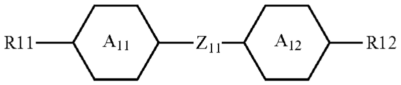

Formula (III)

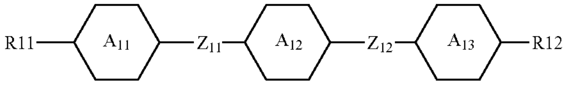

-continued

Formula (IV)

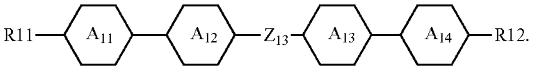

In Formulas (II) to (IV), R11 and R12 are independently H, a C1-C15 alkyl group, or a C2-C15 alkenyl group. The C1-C15 alkyl group is, for example, an unsubstituted C1-C15 alkyl group or a C1-C15 alkyl group substituted with —O—, —CO—, or —COO—. The C2-C15 alkenyl group is, for example, an unsubstituted C2-C15 alkenyl group or a C2-C15 alkenyl group substituted with —O—, —CO—, or —COO—.

$A_{11}$, $A_{12}$, $A_{13}$, and $A_{14}$ are independently selected from a group consisting of 1,4-phenylene, 1,4-cyclohexylene, and 2,5-tetrahydropyranylene. 1,4-phenylene is, for example, unsubstituted 1,4-phenylene or 1,4-phenylene substituted with at least one F or Cl. 1,4-cyclohexylene includes unsubstituted 1,4-cyclohexylene or 1,4-cyclohexylene substituted with at least one F or Cl. 2,5-tetrahydropyranylene is, for example, unsubstituted 2,5-tetrahydropyranylene or 2,5-tetrahydropyranylene substituted with at least one F or Cl.

$Z_{11}$, $Z_{12}$, and $Z_{13}$ are independently a single bond, —O—, —$F_2CO$—, or —COO—.

In the liquid crystal mixture of this embodiment, based on the total weight of the liquid crystal mixture, the content of the compound represented by Formula (I) is, for example, between 10 wt % and 40 wt %, and the content of the at least one compound selected from the group consisting of the compounds represented by Formulas (II) to (IV) is, for example, between 10 wt % and 50 wt %.

Since the liquid crystal mixture of this embodiment contains the compound represented by Formula (I), the liquid crystal mixture of this embodiment also has high thermal stability, a high clearing point, and good dielectric properties.

In addition, in another embodiment, a liquid crystal mixture is formed by the compound represented by Formula (I) and at least one compound selected from a group consisting of compounds represented by Formulas (V) to (VII):

Formula (V)

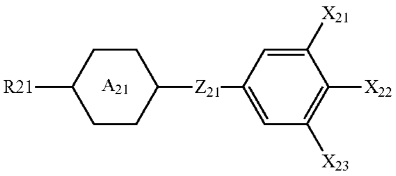

Formula (VI)

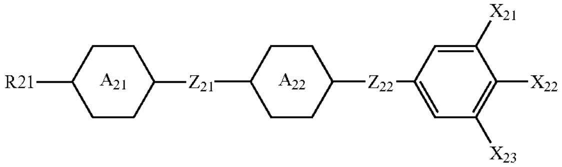

Formula (VII)

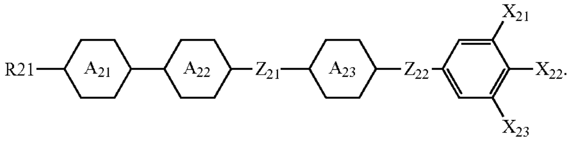

In Formulas (V) to (VII), $X_{21}$, $X_{22}$, and $X_{23}$ are independently F, Cl, —$CF_3$ or —$OCF_3$, with F or —$OCF_3$ being preferred.

R21 is H, a C1-C15 alkyl group, or a C2-C15 alkenyl group. The C1-C15 alkyl group is, for example, an unsubstituted C1-C15 alkyl group or a C1-C15 alkyl group substituted with —O—, —CO—, or —COO—. The C2-C15 alkenyl group is, for example, an unsubstituted C2-C15 alkenyl group or a C2-C15 alkenyl group substituted with —O—, —CO—, or —COO—.

$A_{21}$, $A_{22}$, and $A_{23}$ are independently selected from a group consisting of 1,4-phenylene, 1,4-cyclohexylene, and 2,5-tetrahydropyranylene. 1,4-phenylene is, for example, unsubstituted 1,4-phenylene or 1,4-phenylene substituted with at least one F or Cl. 1,4-cyclohexylene includes unsubstituted 1,4-cyclohexylene or 1,4-cyclohexylene substituted with at least one F or Cl. 2,5-tetrahydropyranylene is, for example, unsubstituted 2,5-tetrahydropyranylene or 2,5-tetrahydropyranylene substituted with at least one F or Cl.

$Z_{21}$ and $Z_{22}$ are independently a single bond, —O—, —$F_2CO$—, or —COO—.

In the liquid crystal mixture of this embodiment, based on the total weight of the liquid crystal mixture, the content of the compound represented by Formula (I) is, for example, between 10 wt % and 40 wt %, and the content of the at least one compound selected from the group consisting of the compounds represented by Formula (V) to Formula (VII) is, for example, between 10 wt % and 50 wt %.

Since the liquid crystal mixture of this embodiment contains the compound represented by Formula (I), the liquid crystal mixture of this embodiment also has high thermal stability, a high clearing point, and good dielectric properties.

Some embodiments of the liquid crystal compound and the liquid crystal mixture of the present invention are described with reference to the following Experimental Examples and Comparative Examples below.

Experimental Example 1

A method for preparing a liquid crystal compound represented by Formula (I-A) includes the following steps.

I-A

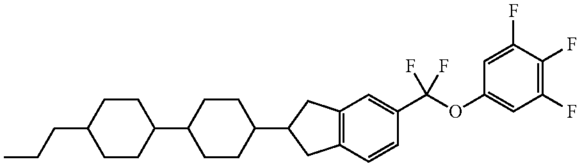

Step 1 (Synthesis of Compound A1)

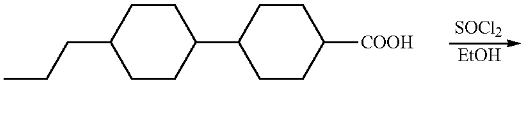

-continued

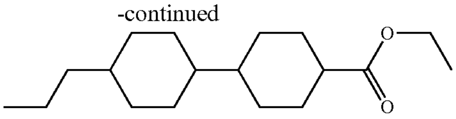

A1

340 g of propylbicylohexyl carboxylic acid and 3 L of ethanol were added into a 5 L three-necked bottle. Next, at 0° C., 200 mL of $SOCl_2$ was added dropwise, and the reaction solution was stirred at room temperature for 12 h. After reaction, ethanol was removed through vacuum distillation, to obtain a viscous liquid. Then, the obtained viscous liquid was dissolved in 3 L of petroleum ether, and then subjected to silica gel column separation, to obtain 361 g of a viscous oily product (with a yield of 95% and a purity (measured with a gas chromatograph) higher than 99%).

Step 2 (Synthesis of Compound A2)

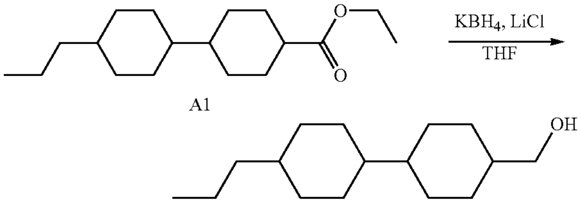

A1

A2

361 g of A1, 104 g of potassium borohydride, 82 g of anhydrous lithium chloride, 1.5 L of tetrachlorodibenzofuran were added into a 3 L three-necked bottle, and heated to reflux. The reaction was monitored through thin layer chromatography (TLC) until the reaction was completed. The reaction solution was cooled to room temperature, and a mixture of 250 mL of concentrated hydrochloric acid and 1.2 kg ice water was added. The mixture was extracted with ethyl acetate, and the solvent was removed, to obtain 276 g of a white solid (with a yield of 90% and a purity (measured with a gas chromatograph) higher than 99%).

Step 3 (Synthesis of Compound A3)

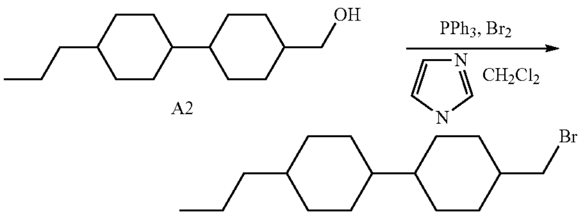

A2

A3

A mixture of 276 g of A2, 365 g of triphenyl phosphine, 95 g of imidazole, and 2.5 L of dichloromethane was continuously stirred, 72 mL of bromine was slowly added dropwise, and the temperature was controlled below 10° C. After addition, the reaction solution was continuously stirred for 3 h at room temperature. Then, dichloromethane was removed, petroleum ether was added, and the mixture was stirred and filtered to obtain a product. The obtained product was washed with petroleum ether three times, separated through column chromatography, and concentrated to obtain 300 g of a white solid (with a yield of 86% and a purity (measured with a gas chromatograph) higher than 99%).

Step 4 (Synthesis of Compound A4)

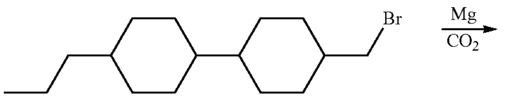

A3

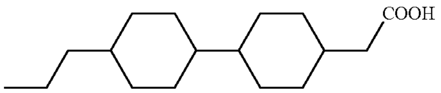

A4

29 g of magnesium, 300 mL of tetrahydrofuran, and a small amount of iodine were added into a 3 L three-necked bottle. Then, under the protection of nitrogen, a small amount of a solution of 300 g of A3 and 1.2 L of tetrahydrofuran was added dropwise. After the reaction was started, the rest solution was added. After addition, the reaction solution was refluxed for 1 h. Then, the temperature was lowered to −40° C. Then, carbon dioxide gas was fed, and the temperature was controlled below −30° C. After reaction, the temperature was raised back to room temperature, and the reaction solution was poured into a mixture of 200 mL of hydrochloric acid and 800 g of ice water, and the mixture was extracted with toluene and water. Then, the organic layer was taken, and the solvent was removed, to obtain a yellow solid, which was recrystallized twice with toluene, to obtain 182 g of a white solid (with a yield of 68% and a purity (measured by a gas chromatograph) higher than 95%).

Step 5 (Synthesis of Compound A5)

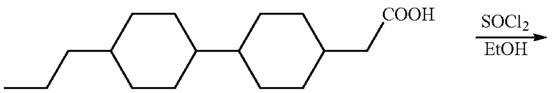

A4

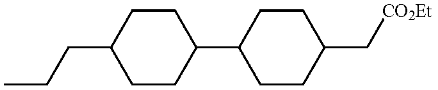

A5

100 mL of $SOCl_2$ was added into a mixture consisting of 182 g of A4 and 1.5 L of ethanol, and the temperature was controlled below 0° C. After addition, the reaction solution was stirred at room temperature for 12 h. After reaction, ethanol was removed, petroleum ether was added for column chromatography, and a viscous liquid was obtained after concentration. The viscous liquid was dissolved in ethanol under heating, cooled, filtered, and concentrated, to obtain 173 g of a viscous liquid (with a yield of 86% and a purity (measured by a gas chromatograph) higher than 99%).

Step 6 (Synthesis of Compound A6)

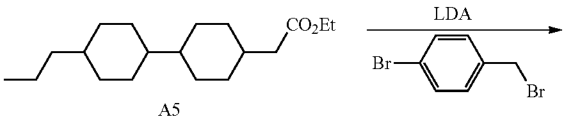

A5

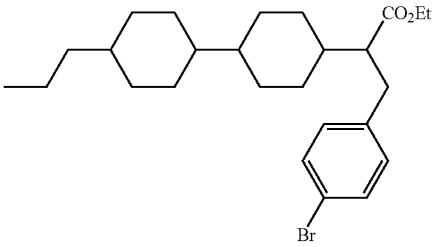

A6

78 mL of n-butyl lithium solution (2.4 mol/L) was added into a mixture of 21 g of diisopropylamine and 500 mL of tetrahydrofuran, and the temperature was controlled below −10° C. After addition, the reaction solution was stirred for 1 h at 0° C., and then the temperature is lowered to −78° C. Then, a solution of 50 g of A5 and 100 mL of tetrahydrofuran was added dropwise. After addition, the temperature was controlled below −78° C., and the reaction solution was stirred for 1 h. Then, a solution of 46.8 g of p-bromobenzene compound and 100 mL of tetrahydrofuran was added. After addition, the temperature was controlled below −78° C., and the reaction solution was stirred for 1 h. Then the temperature was raised back to room temperature, and the reaction solution was poured into a mixture of 50 mL of concentrated hydrochloric acid and 300 g of ice. The water layer was extracted with ethyl acetate. The organic layer was washed with water to be neutral, and concentrated, to obtain a white solid. Then, the solid was recrystallized with isopropanol, to obtain 65 g of a white solid (with a yield of 83% and a purity (measured by a gas chromatograph) higher than 97%).

Step 7 (Synthesis of Compound A7)

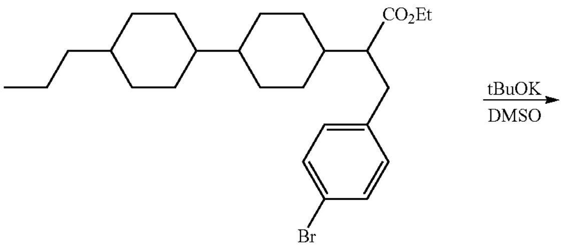

A6

-continued

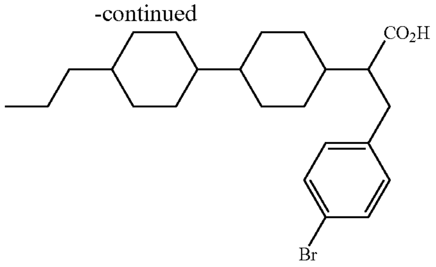

A7

600 g of DMSO and 68 g of potassium tert-butanolate was added into a 1 L three-necked bottle, and stirred at 25° C. for 1 h. Then, 35 g of A6 was into the reaction solution, and the reaction solution was continuously stirred. The reaction was monitored through TLC until the reaction was completed. The reaction solution was poured into a large amount of water, and a light yellow solid was precipitated. Then, the solution was filtered, to obtain 19 g of a light yellow solid (with a yield of 58%).

Step 8 (Synthesis of Compound A8)

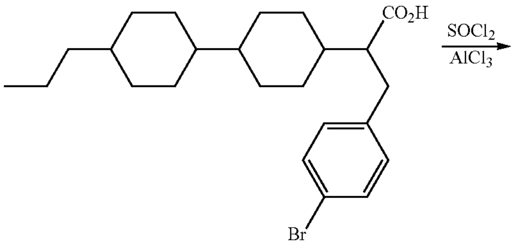

A7

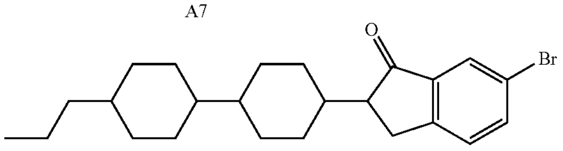

A8

19 g of A7 and 50 mL of $SOCl_2$ were added into a 250 mL three-necked bottle, and heated to reflux for 3 h. Next, excessive $SOCl_2$ was removed through vacuum distillation, and 150 mL of dichloromethane were added. Then, the temperature was lowered to −5° C., and 6.4 g of anhydrous aluminum chloride were added in batches. Then, the temperature was controlled between 0° C. and 5° C., and the reaction solution was stirred for 2 h. After reaction, the reaction solution was poured into a mixture of 10 mL of concentrated hydrochloric acid and 80 g of ice, extracted with dichloromethane and water, washed with 10% dilute hydrochloric acid once, and washed with a saturated sodium chloride solution three times. Then, the solution was dried and concentrated, and the resulting solid was dissolved in ethanol under heating, and then the ethanol solution was poured out. The dissolving was repeated three times, and the ethanol solutions were combined, and subjected to freeze crystallization, to obtain 6 g of a white or light yellow solid (with a yield of 33% and a purity (measured by a gas chromatograph) higher than 98%).

Step 9 (Synthesis of Compound A9)

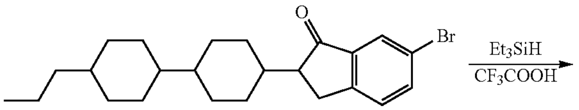

A8

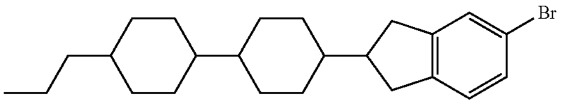

A9

6 g of A8, 50 mL of trifluoroacetic acid and 30 mL of triethyl silane were added into a 250 ml three-necked bottle, and heated to 50° C. with stirring. The reaction was monitored through gas chromatography (GC) until the reaction was completed, and the reaction solution was cooled to room temperature, and slowly added into a mixture of a saturated sodium bicarbonate solution and ice, to precipitate a light yellow solid. Then, the product is washed with water, dried, and dissolved in petroleum ether, and subjected to column chromatography. Then, the product was recrystallized with ethanol, to obtain 4.2 g of a white solid (with a yield of 72% and a purity (measured by a gas chromatograph) higher than 96%).

Step 10 (Synthesis of Compound A10)

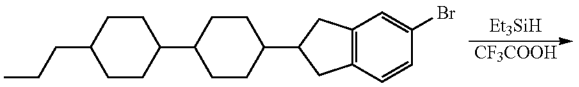

A9

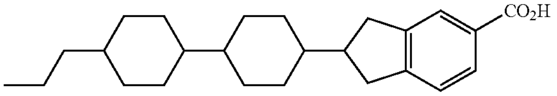

A10

1 g of A9 and 50 mL of tetrahydrofuran were added into a 250 mL three-necked bottle. Then, under nitrogen, the temperature was lowered to −78° C. Then, 5.2 mL of n-butyl lithium solution was added dropwise, and the temperature was controlled below −75° C. After addition, the reaction solution was stirred for 1 h at −78° C. Then, the temperature was raised to −30° C. Then, the reaction solution was stirred for 1 h while the temperature was controlled between −35° C. and −30° C., and then the temperature was lowered to −70° C. Then, carbon dioxide gas was fed, and the temperature was controlled below −40° C. After reaction, the temperature was raised to room temperature, and the reaction solution was poured into a mixture of 2 mL of concentrated hydrochloric acid and 20 g of ice, extracted with toluene and water, and concentrated, to obtain a white solid. Then, the product was recrystallized with toluene, to obtain 0.7 g of a white solid (with a yield of 77% and a melting point (measured with a differential scanning calorimetry (DSC) of between 273° C. and 276° C.).

Step 11 (Synthesis of Compound I-A)

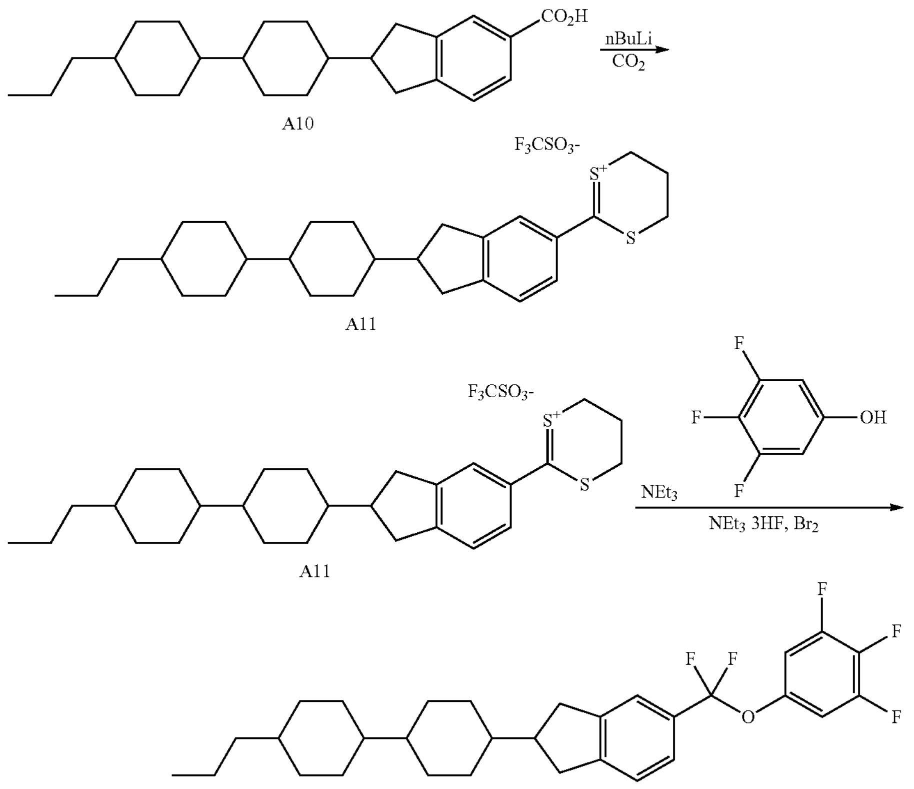

A10

A11

A11

I-A 0.7 g of A10, 0.3 g of 1,3-propanedithiol, 0.4 g of trifluoromethane sulfonic acid, 10 mL of toluene, and 10 mL of petroleum ether were added into a 50 mL three-necked bottle, and heated to reflux for 4 h, and excessive water was removed. After reaction, at room temperature, the reaction solution was poured into 40 mL of ether, to precipitate a light yellow solid. Then, the mixture was stirred for 1 h under cooling with ice water, and subjected to suction filter under nitrogen, to obtain a light yellow solid, which was further washed with ether once and dried, to obtain 0.8 g of a light yellow solid. The obtained 0.8 g light yellow solid was dissolved in 10 mL of dichloromethane, and the solution was added dropwise into a solution of 0.3 g of 3,4,5-trifluoro-phenol, 0.18 g of triethylamine, and 20 mL of dichloromethane. During addition, the temperature was controlled below −78° C. After addition, the reaction solution was continuously stirred for 1 h at −78° C. Then, 1.1 g of triethylamine trihydro fluoride was added. The reaction solution was stirred for 5 min, then 1.1 g of bromine was added dropwise into the reaction solution, and the reaction solution was stirred for 1 h at −78° C. Then, the temperature was raised to −30° C., the reaction solution was poured into a saturated sodium bisulfate solution, and a pH value was adjusted between 5 and 8. Then, the reaction solution was extracted with dichloromethane and water, the product was washed by a saturated sodium chloride solution and dried, and subjected to column chromatography with petroleum ether. Then, the product was recrystallized with petroleum ether, to obtain 0.5 g of a white solid (with a yield of 51% and a purity (measured by a gas chromatograph) higher than 99.5%).

Experimental Example 2

A method for preparing a liquid crystal compound represented by Formula (I-D) includes the following steps.

I-D

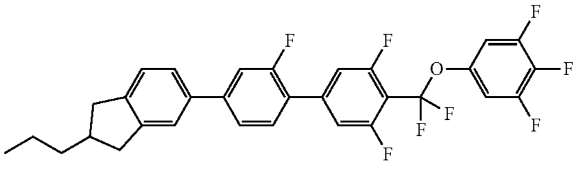

Step 1 (Synthesis of Compound 1d)

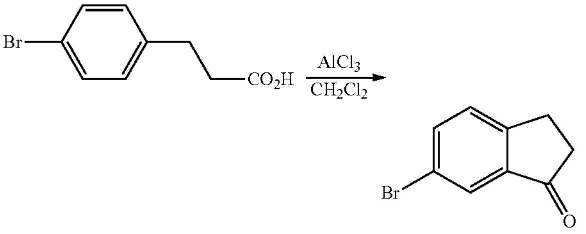

1d 229 g of 4-bromophenylpropionic acid and 357 g of aluminum chloride (AlCl) were added into a 2 L three-necked bottle, and heated to reflux for 3 h. Then, excessive AlCl was removed, and 1.2 L of dichloromethane was added. Then, the temperature was lowered to 5° C., and 3,200 g of AlCl was added. Then, the reaction solution was refluxed for 5 h, and poured into a mixture of hydrochloric acid and ice for hydrolysis. The product was extracted, and subjected to silicone gel separation. Then, the solvent was removed, to obtain 168.8 g of a light yellow solid (with a yield of 80% and a purity (measured by a gas chromatograph) higher than 97%).

Step 2 (Synthesis of Compound 2d)

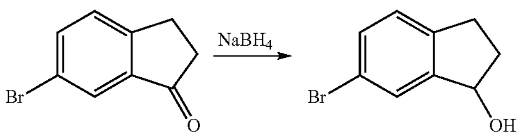

1d 2d 168.8 g of 1d and 650 mL of ethanol were added into a 1 L three-necked bottle. Next, the temperature was controlled below 10° C., and 45 g of $NaBH_4$ were added in batches. Then, the temperature was raised to room temperature, and the reaction solution was continuously stirred for 3 h. After reaction, ethanol was removed, and 450 mL of 10% hydrochloric acid solution was added for perform hydrolysis. The product was extracted with dichloromethane, washed with water, and dried, and the solvent was removed, to obtain 170 g of a light yellow solid (with a yield of 100% and a purity (measured by a gas chromatograph) higher than 97%).

Step 3 (Synthesis of Compound 3d)

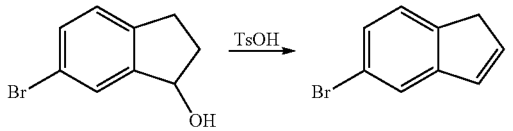

2d 3d 170 g of 2d, 1.2 L of benzene, and 8 g of toluene-p-sulphonic acid were added into a 2 L three-necked bottle, and refluxed for 3 h. After reaction, the reaction solution was washed to be neutral, and benzene was removed. Then, the reaction solution was filtered with 750 mL of petroleum ether and silicon gel. Then, petroleum ether was removed, to obtain 148 g of a light yellow oily substance (with a yield of 95% and a purity (measured by a gas chromatograph) higher than 95%).

Step 4 (Synthesis of Compound 4d)

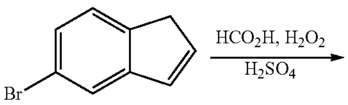

3d

-continued

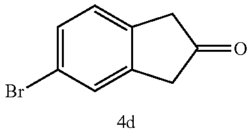

4d 1.5 L of formic acid and 300 mL of 30% $H_2O_2$ were added into a 2 L three-necked bottle, and the temperature was controlled between 35° C. and 40° C. through water bath. Then, 148 g of 3d was added. Then, the reaction solution was stirred for 12 h at room temperature. Then, the reaction solution was poured into a large amount of water, to precipitate a white solid, and filtered. Then, 3 L of 7% sulfuric acid solution was added into a 5 L three-necked bottle, and heated to boil. Then, the above white solid was added into the reaction bottle. Then, the solid was subjected to steam distillation, to obtain 64 g of a white solid (with a yield of 40% and a purity (measured by a gas chromatograph) higher than 95%).

Step 5 (Synthesis of Compound 5d)

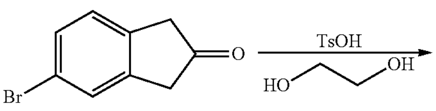

4d

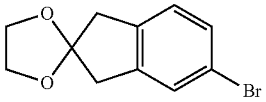

5d 64 g of 4d, 90 mL of ethylene glycol, 600 mL of toluene, and 3 g of toluene-p-sulphonic acid were added into a 1 L three-necked bottle, and heated to reflux for 3.5 h. Then, the heating was stopped, and the reaction solution was washed with water to be neutral. Then, toluene was removed, and the reaction solution was separated with 500 mL of petroleum ether and silicone gel. Then, petroleum ether was removed, the product was recrystallized with 150 mL of isopropanol, to obtain 61 g of a light yellow solid (with a yield of 80% and a purity (measured by a gas chromatograph) higher than 99%).

Step 6 (Synthesis of Compound 6d)

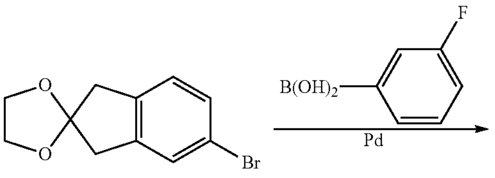

5d

-continued

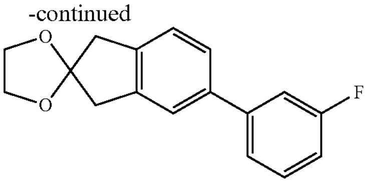

6d 42 g of 5d, 23.1 g of 3-fluorophenylboric acid, 70 g of sodium carbonate, 300 mL of water, 300 mL of ethanol, 600 mL of toluene, and 2 g of $Pd(PPh_3)_4$ were added into a 2 L three-necked bottle. Then, under the protection of nitrogen, the reaction solution was heated to reflux for 6 h. Then, the obtained gray-black solid was subjected to petroleum ether column chromatography, and then recrystallized, to obtain 38 g of a light yellow solid (with a yield of 85% and a purity (measured by a gas chromatograph) higher than 99%).

Step 7 (Synthesis of Compound 7d)

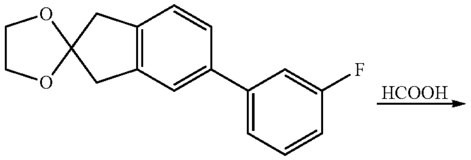

6d

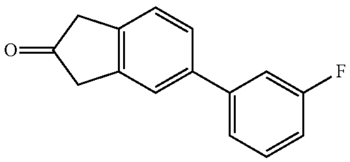

7d 38 g of 6d, 200 mL of 84% formic acid solution, and 150 mL of toluene were added into a 500 mL three-necked bottle. Then, the temperature was controlled at 20° C., and the reaction solution was stirred for 20 h. After reaction, the reaction solution was extracted with water for separation, and crystallized with isopropanol, to obtain 28 g of a light yellow solid (with a yield of 88% and a purity (measured by a gas chromatograph) higher than 99%).

Step 8 (Synthesis of Compound 8d)

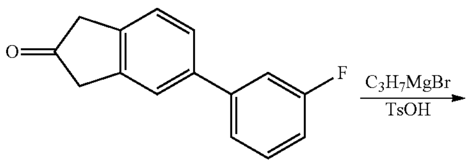

7d

-continued

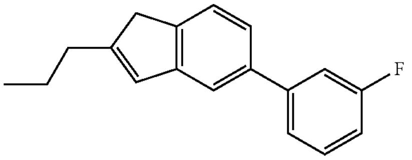

8d 3.3 g of magnesium powder, 50 mL of anhydrous tetrahydrofuran, a grain of iodine, and several drops of bromopropane were added into a 500 mL three-necked bottle. Then, the reaction solution was heated mildly under the protection of nitrogen. After the reaction is triggered, a mixture of 18 g of bromopropane and 150 mL of anhydrous tetrahydrofuran was added dropwise (the adding speed was maintained at a level to prevent the temperature from rising dramatically and to keep a slow refluxing). After addition, the reaction solution was refluxed for 1 h. Then, the reaction temperature was lowered to −10° C., and a mixture of 28 g of 7d and 150 mL of anhydrous tetrahydrofuran was further added dropwise. After addition, the temperature was controlled at −10° C., and the reaction solution was stirred for 12 h. Then, the reaction solution was poured into a mixture of hydrochloric acid and ice for hydrolysis, and was extracted twice with toluene for separation. Then, the extract was distilled to about 250 mL, into which 1 g of toluene-p-sulphonic acid was added. Then, the solution was refluxed and dehydrated for 2 h, to obtain a brownish red oily substance. Then, the product was subjected to column chromatography, and recrystallized and purified, to obtain 10 g of a light yellow solid (with a yield of 32% and a purity (measured by a gas chromatograph) higher than 99%).

Step 9 (Synthesis of Compound 9d)

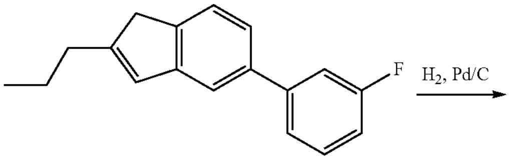

8d

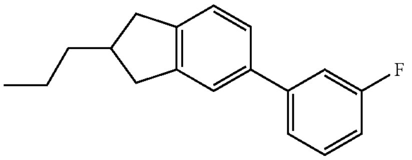

9d 10 g of 8d, 1 g of 5% Pd/C, 100 mL of ethanol and 100 mL of toluene were added into a 1 L hydrogen reactor, and the pressure of hydrogen was 1 MP. The hydrogen is supplied for 6 h at 25° C. to obtain 9.5 g of white solid (with a yield of 94% and a purity (measured by a gas chromatograph) higher than 99%).

Step 10 (Synthesis of Compound 10d)

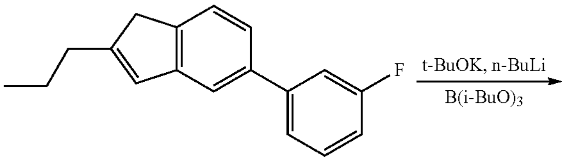

9d

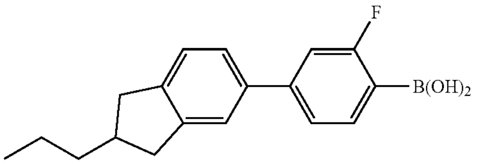

10d 9.5 g of 9d, 4.2 g of t-BuOK, and 100 mL of anhydrous tetrahydrofuran were added into a 250 mL three-necked bottle. Then, under the protection of nitrogen, the temperature was lowered to −100° C., and 17 mL of a solution of n-BuLi in hexane (2.4 mol/L) was added dropwise. After addition, the temperature was controlled at −100° C., and the reaction solution was stirred for 1 h. Then, a mixture of 9.5 g of triisobutyl borate and 50 mL of anhydrous tetrahydrofuran was added. After addition, the temperature was controlled at −100° C., and the reaction solution was stirred for 1 h. Then, the temperature was raised to room temperature for hydrolysis, to obtain 7.2 g of a yellow solid (with a yield of 65%).

Step 11 (Synthesis of Compound I-D)

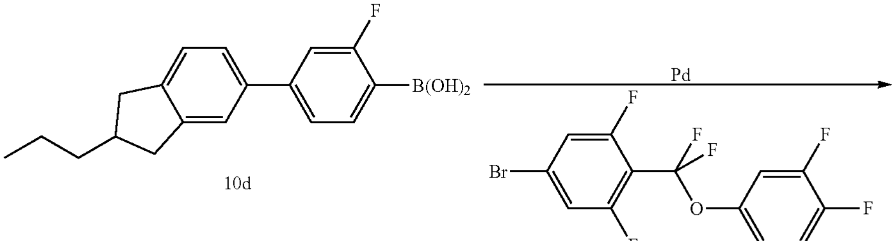

10d

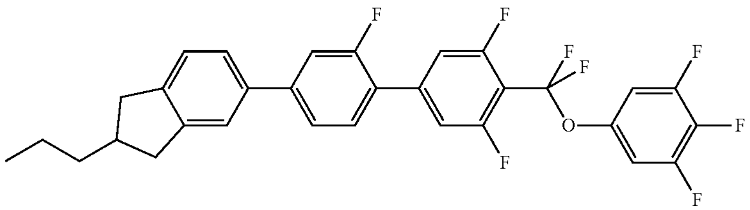

I-D 7.2 g of 10d, 9.4 g of 5-bromo-2(difluoro(3,4,5-trifluorophenoxy)methyl)1,3-difluorobenzene, 10.2 g of sodium carbonate, 50 mL of water, 50 mL of ethanol, 100 mL of toluene and 0.25 g of $Pd(PPh_3)_4$ were added into a 500 mL three-necked bottle. Then, under the protection of nitrogen, the reaction solution was heated to reflux for 6 h. After conventional treatment, a light yellow oily substance was obtained. Then, the product was subjected to column chromatography with petroleum ether, and recrystallized with ethanol multiple times. Then, the product was purified, to obtain 5 g of a white solid (with a yield of 45% and a purity (measured by a gas chromatograph) higher than 99.9%).

Comparative Examples 1 to 3

Compound Ref-1, Compound Ref-2, and Compound Ref-3 were synthesized according to techniques disclosed in European Patent No. 0786445.

Ref-1

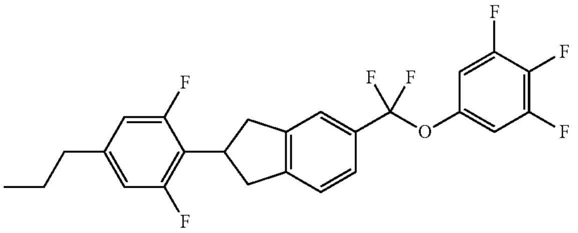

-continued

Ref-2

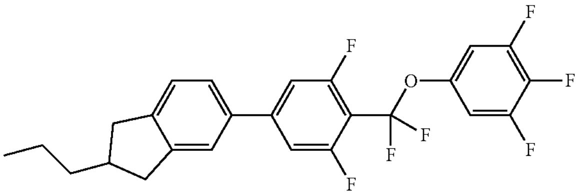

Ref-3

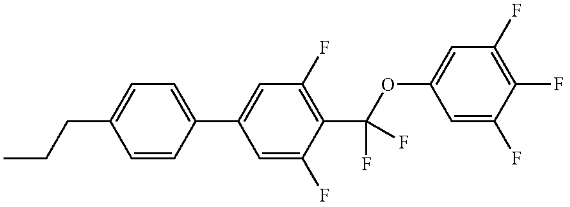

Measurements of dielectric constant (Δ∈), thermogravimetric Analysis (TGA), and phase transition temperature (C—N—I) were performed on the compounds of Experimental Examples 1 and 2 and Comparative Examples 1 to 3. The results are shown in Table 1.

TABLE 1

| | I-A | I-D | Ref-1 | Ref-2 | Ref-3 |
|---|---|---|---|---|---|
| C-N-I | C122N175I | C68.8N114I | C54I | C36.5I | C45N61I |
| Δϵ | 11.59 | 31 | 20.3 | 22.5 | 21 |
| TGA (° C.) (loss of 5%) | 280 | 260 | 190 | 180 | 186 |

The compounds of Comparative Examples 1 to 3 are conventional liquid crystal compounds having a large dielectric constant. According to Table 1, compared with the compounds of Comparative Examples 1 to 3, Compounds I-A and I-D of Experimental Examples 1 and 2 (the liquid crystal compounds of the present invention) have high thermal stability, and a high clearing point, and good dielectric properties.

In the following, Compound I-D (the liquid crystal compound of the present invention) and Compound Ref-3 (Comparative Example 3) are respectively combined with other liquid crystal compounds to form a liquid crystal mixture. Dielectric constants (Δ∈), phase transition temperatures (C—N—I), and birefringence (Δn) of the liquid crystal mixtures are measured, and the results are shown in Tables 2 to 5.

The compounds combined with Compound I-D and Compound Ref-3 are as follows.

I-B

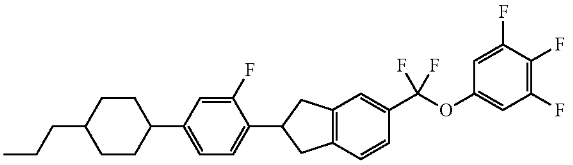

-continued

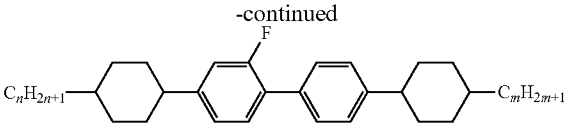

CBC-nmF

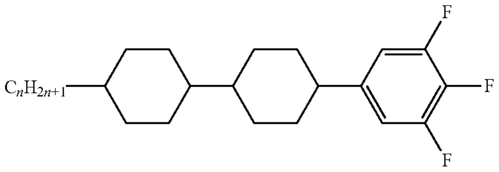

CCP-nF.F.F

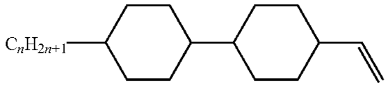

CC-n-V

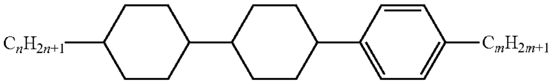

CCP-nm

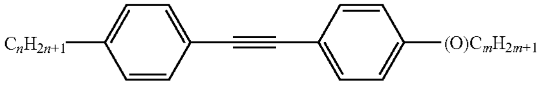

PTP-n(O)m

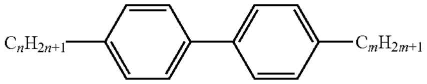

PP-nm

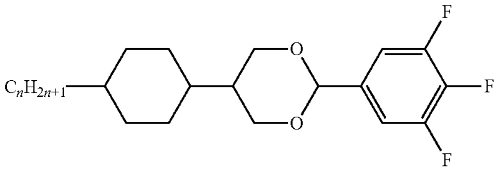

CDU-n-F

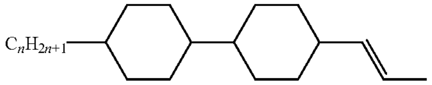

CC-n-V1

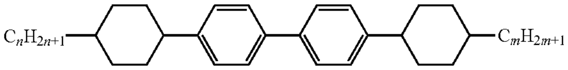

CBC-n-m

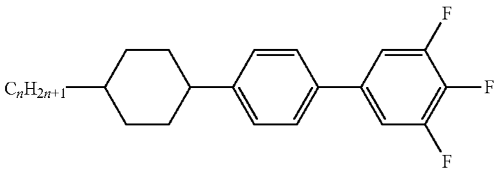

BCH-nF.F.F

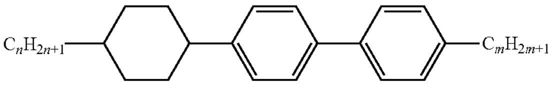

CPP-nm

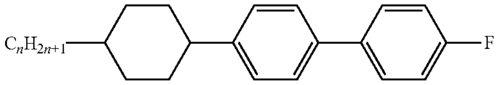

BCH-nF

-continued

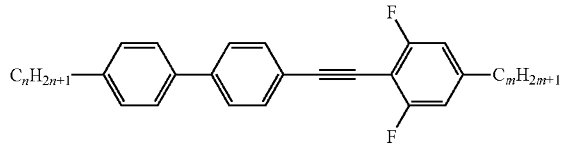

PPTUI-nm

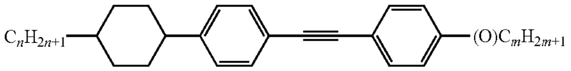

CPTP-n(O)m

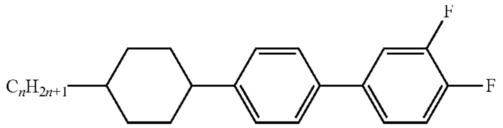

BCH-nF.F

TABLE 2

| Composition | Proportion (%) | Characteristics |
|---|---|---|
| CC-3-V | 34 | Tni = 78° C. |
| PP-51 | 10 | Δϵ = 7.51 |
| CCP-32 | 7 | Δn = 0.1277 |
| BCH-2F | 7 | |
| BCH-3F | 7 | |
| BCH-5F | 7 | |
| I-D | 28 | |

TABLE 3

| Composition | Proportion (%) | Characteristics |
|---|---|---|
| CC-3-V | 37 | Tni = 74° C. |
| CC-3-V1 | 6 | Δϵ = 6.13 |
| PP-51 | 10 | Δn = 0.1221 |
| CPTP-32 | 5 | |
| CPP-32 | 7 | |
| BCH-2F | 5 | |
| BCH-3F | 5 | |
| I-D | 25 | |

TABLE 4

| Composition | Proportion (%) | Characteristics |
|---|---|---|
| CC-3-V | 36 | Tni = 79° C. |
| CC-3-V1 | 8 | Δϵ = 7.22 |
| CPTP-32 | 5 | Δn = 0.1162 |
| CPP-32 | 8 | |
| CBC-33F | 6 | |
| BCH-3F.F.F | 7 | |
| I-B | 15 | |
| I-D | 15 | |

TABLE 5

| Composition | Proportion (%) | Characteristics |
|---|---|---|
| CC-3-V | 28 | Tni = 63° C. |
| CPTP-32 | 3 | Δϵ = 7.45 |
| CPP-32 | 5 | Δn = 0.121 |
| BCH-2F | 8 | |
| BCH-3F | 6 | |
| BCH-2F.F | 7 | |
| BCH-3F.F | 7 | |

TABLE 5-continued

| Composition | Proportion (%) | Characteristics |
|---|---|---|
| CBC-33F | 8 | |
| Ref-3 | 28 | |

It can be known from Tables 2 to 5, compared with the liquid crystal mixture containing the liquid crystal compound Ref-3, the liquid crystal mixture containing the liquid crystal compound (I-D) of the present invention has a high phase transition temperature (Tni), thus having high thermal stability, a high clearing point, and good dielectric properties. Therefore, an LCD using the liquid crystal mixture containing the liquid crystal compound of the present invention may have good display performance and a low driving voltage, thus achieving the purpose of electricity saving.

The invention being thus described, it is not intended to limit the present invention. Any equivalent replacement of modification or improvement made by one skilled in the art without departing from the spirit and scope of the present invention is also intended to be included within the scope of the following claims.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal mixture, comprising:

a compound represented by Formula (I):

Formula (I)

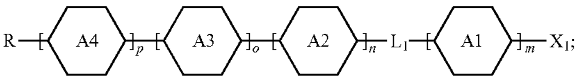

and at least one compound selected from a group consisting of compounds represented by Formulas (II) to (IV):

Formula (II)

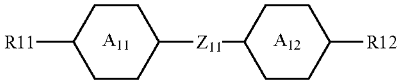

Formula (III)

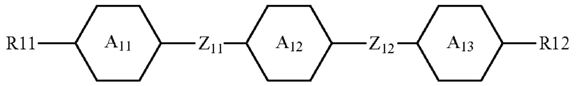

Formula (IV)

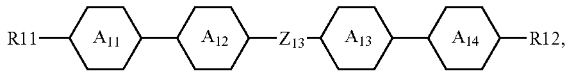

wherein $X_1$ is F, Cl, —CF3 or —$OCF_3$; R, R11 and R12 are independently H, a C1-C15 alkyl group, or a C2-C15 alkenyl group; A1 is 1,4-phenylene; $A_{11}$, $A_{12}$, $A_{13}$ and $A_{14}$ are independently selected from a group consisting of 1,4-phenylene, 1,4-cyclohexylene, and 2,5-tetrahydropyranylene; at least one of A2, A3 and A4 is 2,5-indanylene, and the others are independently selected from a group consisting of 1,4-phenylene, 1,4-cyclohexylene, and 2,5-tetrahydropyranylene; $L_1$ is —$F_2$CO—; $Z_{11}$, $Z_{12}$, and $Z_{13}$ are independently a single bond, —O—, —$F_2$CO—, or —COO—; m is 1; and n, o, and p are independently an integer of 0 to 3, and n+o+p≧3.

2. The liquid crystal mixture according to claim 1, wherein $X_1$ is F or —$OCF_3$.

3. The liquid crystal mixture according to claim 1, wherein the C1-C15 alkyl group comprises an unsubstituted C1-C15 alkyl group or a C1-C15 alkyl group substituted with —O—, —CO—, or —COO—.

4. The liquid crystal mixture according to claim 1, wherein the C2-C15 alkenyl group comprises an unsubstituted C2-C15 alkenyl group or a C2-C15 alkenyl group substituted with —O—, —CO—, or —COO—.

5. The liquid crystal mixture according to claim 1, wherein 1,4-phenylene comprises unsubstituted 1,4-phenylene or 1,4-phenylene substituted with at least one F or Cl.

6. The liquid crystal mixture according to claim 1, wherein 1,4-cyclohexylene comprises unsubstituted 1,4-cyclohexylene or 1,4-cyclohexylene substituted with at least one F or Cl.

7. The liquid crystal mixture according to claim 1, wherein 2,5-tetrahydropyranylene comprises unsubstituted 2,5-tetrahydropyranylene or 2,5-tetrahydropyranylene substituted with at least one F or Cl.

8. The liquid crystal mixture according to claim 1, wherein 2,5-indanylene comprises unsubstituted 2,5-indanylene or 2,5-indanylene substituted with at least one F or Cl.

9. The liquid crystal mixture according to claim 1, wherein based on the total weight of the liquid crystal mixture, a content of the compound represented by Formula (I) is between 10 wt % and 40 wt %.

10. The liquid crystal mixture according to claim 1, wherein based on the total weight of the liquid crystal mixture, a content of the at least one compound selected from the group consisting of the compounds represented by Formulas (II) to (IV) is between 10 wt % and 50 wt %.

11. A liquid crystal mixture, comprising:

a compound represented by Formula (I):

Formula (I)

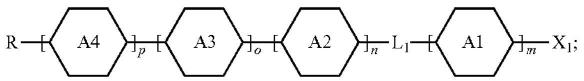

and at least one compound selected from a group consisting of compounds represented by Formulas (V) to (VII):

Formula (V)

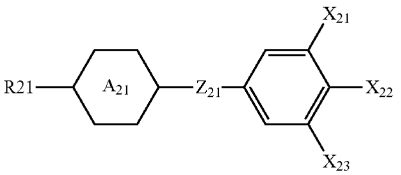

-continued

Formula (VI)

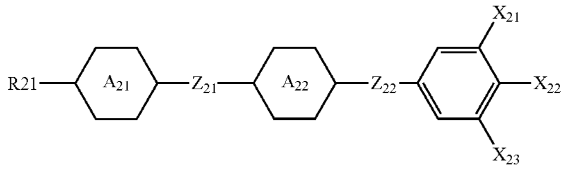

Formula (VII)

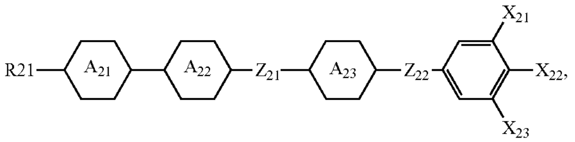

wherein $X_1$, $X_{21}$, $X_{22}$, and $X_{23}$ are independently F, Cl, —$CF_3$, or —$OCF_3$; R and R21 are independently H, a C1-C15 alkyl group, or a C2-C15 alkenyl group; A1 is 1,4-phenylene; $A_{21}$, $A_{22}$, and $A_{23}$ are independently selected from a group consisting of 1,4-phenylene, 1,4-cyclohexylene, and 2,5-tetrahydropyranylene; at least one of A2, A3 and A4 is 2,5-indanylene, and the others are independently selected from a group consisting of 1,4-phenylene, 1,4-cyclohexylene, and 2,5-tetrahydropyranylene; $L_1$ is —$F_2$CO—; $Z_{21}$ and $Z_{22}$ are independently a single bond, —O—, —$F_2$CO—, or —COO—; m is 1; and n, o, and p are independently an integer of 0 to 3, and n+o+p≧3.

12. The liquid crystal mixture according to claim 11, wherein $X_1$, $X_{21}$, $X_{22}$, and $X_{23}$ are independently F or —$OCF_3$.

13. The liquid crystal mixture according to claim 11, wherein the C1-C15 alkyl group comprises an unsubstituted C1-C15 alkyl group or a C1-C15 alkyl group substituted with —O—, —CO—, or —COO—.

14. The liquid crystal mixture according to claim 11, wherein the C2-C15 alkenyl group comprises an unsubstituted C2-C15 alkenyl group or a C2-C15 alkenyl group substituted with —O—, —CO—, or —COO—.

15. The liquid crystal mixture according to claim 11, wherein 1,4-phenylene comprises unsubstituted 1,4-phenylene or 1,4-phenylene substituted with at least one F or Cl.

16. The liquid crystal mixture according to claim 11, wherein 1,4-cyclohexylene comprises unsubstituted 1,4-cyclohexylene or 1,4-cyclohexylene substituted with at least one F or Cl.

17. The liquid crystal mixture according to claim 11, wherein 2,5-tetrahydropyranylene comprises unsubstituted 2,5-tetrahydropyranylene or 2,5-tetrahydropyranylene substituted with at least one F or Cl.

18. The liquid crystal mixture according to claim 11, wherein 2,5-indanylene comprises unsubstituted 2,5-indanylene or 2,5-indanylene substituted with at least one F or Cl.

19. The liquid crystal mixture according to claim 11, wherein based on the total weight of the liquid crystal mixture, a content of the compound represented by Formula (I) is between 10 wt % and 40 wt %.

20. The liquid crystal mixture according to claim 11, wherein based on the total weight of the liquid crystal mixture, the content of the at least one compound selected from the group consisting of the compounds represented by Formula (V) to Formula (VII) is between 10 wt % and 50 wt %.

21. A liquid crystal compound, represented by Formula (I):

Formula (I)

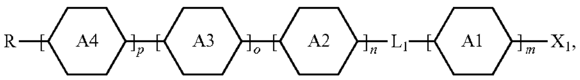

wherein $X_1$ is F, Cl, —$CF_3$ or —$OCF_3$; $L_1$ is —$F_2CO$—; R is H, a C1-C15 alkyl group, or a C2-C15 alkenyl group; A1 is 1,4-phenylene; at least one of A2, A3 and A4 is 2,5-indanylene, and the others are independently selected from a group consisting of 1,4-phenylene, 1,4-cyclohexylene, and 2,5-tetrahydropyranylene; m is 1; and n, o, and p are independently an integer of 0 to 3, and $n+o+p \geqq 3$.

22. The liquid crystal compound according to claim 21, wherein $X_1$ is F or —$OCF_3$.

23. The liquid crystal compound according to claim 21, wherein the C1-C15 alkyl group comprises an unsubstituted C1-C15 alkyl group or a C1-C15 alkyl group substituted with —O—, —CO—, or —COO—.

24. The liquid crystal compound according to claim 21, wherein the C2-C15 alkenyl group comprises an unsubstituted C2-C15 alkenyl group or a C2-C15 alkenyl group substituted with —O—, —CO—, or —COO—.

25. The liquid crystal compound according to claim 21, wherein 1,4-phenylene comprises unsubstituted 1,4-phenylene or 1,4-phenylene substituted with at least one F or Cl.

26. The liquid crystal compound according to claim 21, wherein 1,4-cyclohexylene comprises unsubstituted 1,4-cyclohexylene or 1,4-cyclohexylene substituted with at least one F or Cl.

27. The liquid crystal compound according to claim 21, wherein 2,5-tetrahydropyranylene comprises unsubstituted 2,5-tetrahydropyranylene or 2,5-tetrahydropyranylene substituted with at least one F or Cl.

28. The liquid crystal compound according to claim 21, wherein 2,5-indanylene comprises unsubstituted 2,5-indanylene or 2,5-indanylene substituted with at least one F or Cl.

* * * * *

UNITED STATES PATENT AND TRADEMARK OFFICE

CERTIFICATE OF CORRECTION

PATENT NO. : 8,388,861 B2
APPLICATION NO. : 13/049905
DATED : March 5, 2013
INVENTOR(S) : Wang et al.

It is certified that error appears in the above-identified patent and that said Letters Patent is hereby corrected as shown below:

On the Title page of the patent grant, the item (73) Assignee's Name --Daxin Materials Corporation, Taichung City (TW)-- and --Jiangsu Hecheng Display Technology Co., Ltd., JIANGSU PROVINCE (CN)-- should be listed.

Signed and Sealed this
Fourteenth Day of May, 2013

Teresa Stanek Rea
*Acting Director of the United States Patent and Trademark Office*